Figure 1:
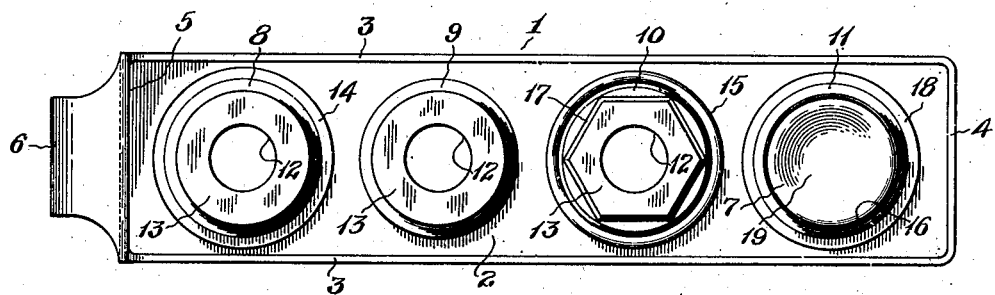

June 24, 1941.    L. G. HENNING    2,247,019

INDIVIDUAL ICE MOLD

Filed May 22, 1939

INVENTOR:
LESLIE G. HENNING
BY
ATTORNEY

Patented June 24, 1941

2,247,019

UNITED STATES PATENT OFFICE 2,247,019

INDIVIDUAL ICE MOLD

Leslie G. Henning, Cleveland, Ohio, assignor to Frank L. Sessions, Lakewood, Ohio Application May 22, 1939, Serial No. 275,117

8 Claims. (Cl. 62—108.5)

My invention relates to molds in which small ice cakes or "cubes" are frozen in household mechanical refrigerators.

Broadly, my invention relates to receptacles in which liquids may be congealed by cooling.

I am filing on even date herewith two other applications, Serial No. 275,115 and Serial No. 275,116 covering related subject matter, and it is possible that certain features shown but not claimed in one application are claimed in one of the copending applications.

In application Serial No. 275,115 I have shown and described an ice mold which has an ice exit at one end to permit ice which may be frozen in the mold cavity to pass out of it, a removable imperforate closure for said exit, and another opening or perforation through the wall of the mold cavity opposite the ice exit to admit air to prevent the formation of a vacuum behind the ice, which would resist its removal from the mold. In that application I have shown a plurality of molds telescoped together to form a stack of molds with a single imperforate closure for the ice exit of the last mold of the stack. A connected series of ice cakes may be simultaneously frozen in such a stack, the individual molds of which may be separated one by one and the ice removed therefrom without disturbing the other molds of the stack. Preferably the stack of such molds is supported with its axis horizontal in the refrigerator, the opening opposite the ice exit of the first mold of the stack being small enough to prevent the water from leaking out of the otherwise closed stack of molds.

In the invention of my said application Serial No. 275,116, instead of telescoping a plurality of molds together in a stack as shown and described in my said application Serial No. 275,115, I mount the individual molds in separate, socket-members, the molds having their ice exits uppermost.

A portion of each socket member is preferably made of yielding, elastic material such as rubber, encompassing and making a snug fit upon the outer surface of the mold. The base of the socket member is preferably made of heat-conducting metal. It will be apparent to those skilled in the art that sockets made of relatively non elastic material such as metal or molded plastic material properly fitting the inserted mold may be used instead of yielding, elastic material.

A plurality of socket-members may be secured to the bottom of a metal tray, or, preferably, mold receiving apertures may be formed in a single pad of elastic material such as rubber, which pad may be secured to the bottom of a tray or support which is adapted to be inserted into the customary ice freezing tray compartments of well known household, mechanical refrigerators. The axis of each mold is vertical, instead of being horizontal as shown in my said application Serial No. 275,115. Because the molds are separately supported it is possible to remove from its socket in the tray a single mold with the ice it contains, without handling the other molds which may be in the tray. It is also possible to immediately replace the empty mold in its socket in the tray, refill it with water and replace the tray in the refrigerator without displacing the other molds carried by the tray.

Instead of supporting the molds with their axes horizontal as contemplated in my application Serial No. 275,115 or vertical with the ice exit at the top as contemplated in my application Serial No. 275,116, the molds in my present invention are supported vertically with their ice exits at the bottoms of the molds. Imperforate closures are provided for the ice exits and as the molds and their exit closures are separable, either the mold or the exit closure may properly be described as being removable.

It will be observed that in the inventions of my said application Serial No. 275,115 and Serial No. 275,116 and in my present invention there are embodied the provisions of an ice exit from an ice mold cavity and an opening in the wall of the mold cavity opposite the ice exit for admitting air to break the vacuum which tends to be formed behind the ice when it moves towards the ice exit. Further there are provided in all three of the inventions, molds having thin walls of good heat-conducting material adapted to absorb heat from the hand of the holder or from surrounding medium and cause the bond between the ice and the mold to melt and permit the ice to drop out of it.

If desired, water may be run over the molds to free the ice and, as the ice is substantially entirely enclosed, wasteful melting and washing away of the ice do not occur.

Among the objects of my present invention are the provision of an ice mold having an ice exit at its bottom end adapted to permit the frozen ice to pass out of it, said ice exit being provided with a removable imperforate closure; the provision of an ice mold having an ice exit at its bottom end, said ice exit being provided with a removable imperforate closure, the ice mold having an opening in its top to admit air to prevent the formation of a vacuum behind the ice, which would tend to prevent the ice from leaving the mold; the provision of an ice mold from which the ice may be removed readily without the use of mechanical aids; and the provision of a plurality of individual molds so constructed and assembled that the ice from a single mold may be removed without disturbing that in the other molds.

Further objects of my invention are the provision of a mold that can be quickly and easily filled with water; the provision of an individual mold having an aperature for the admission of air behind the ice to prevent the formation of a vacuum, and by this means to permit the free release of the ice from the mold without undue melting of the ice to admit air from the front of the mold; the provision of a mold from which the ice may be removed without the ice being touched by the hands; the provision of a metal ice mold adapted for freezing water readily because of the good heat conductivity which is provided between the mold and the freezing unit of the refrigerator; and the provision of an ice mold whose shape does not have to be altered or distorted in the removal of the ice from it.

Figure 2:
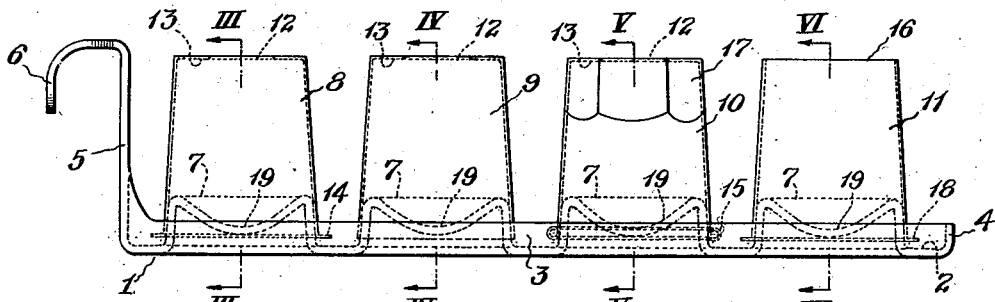
Figures 3, 4, 5, 6:
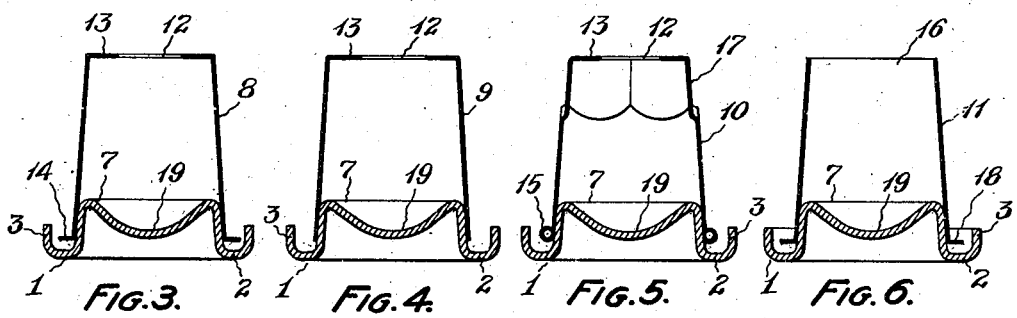
Figures 7, 8:
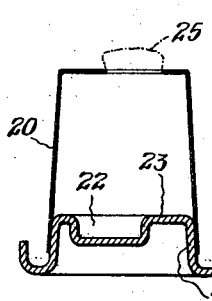
Figure 9:
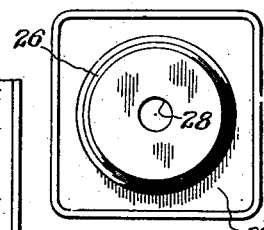
Figure 10:
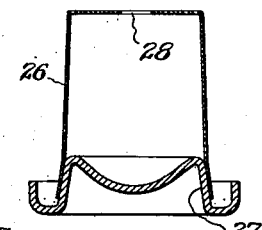

A clear understanding of my invention and its advantages may be had from the following specification and the accompanying drawing in which:

Fig. 1 is a plan and Fig. 2 is a side elevation of a tray embodying four ice exit closures each supporting an individual mold or cup;

Figs. 3, 4, 5 and 6 are respectively axial sections on lines III—III, IV—IV, V—V and VI—VI of the four different forms of molds shown in Figs. 1 and 2; and Figs. 7 and 8 are respectively a plan and an axial section of a modified form of mold and ice exit closure;

Figs. 9 and 10 are respectively a plan and an axial section of another modified form of mold and individual ice exit closure.

Referring to the drawing:

In Figs. 1 and 2 there are shown a plan and side elevation respectively, of a tray 1, having a bottom 2, side walls 3, and end walls 4 and 5. A handle 6, is provided for convenience in handling the tray.

The front end wall 5 is made high enough to form an air shield to minimize the circulation of air around the molds. Two or more narrow trays like that shown in Figs. 1 and 2 may be placed side by side in the refrigerator ice freezing compartment.

In the bottom of the tray there are formed or secured in any suitable manner, ice exit closures 7, which are upwardly tapered to fit the correspondingly tapered ice exits in the lower ends of the ice molds or cups 8, 9, 10 and 11.

In the ice molds shown in Figs. 1 to 6 inclusive the ice exits are tapered the same as are the mold bodies, but the ice exits and closures 7 may be tapered somewhat more than the bodies if desired, as shown in Figs. 9 and 10. I have found that the taper of the closures and ice exits may be from two to seven degrees from the axis of the mold, and the bodies of the molds may be nearly cylindrical or tapered as desired to facilitate the release of the ice. The exit closures 7 support the mold in upright position and also make water tight joints with their inside surfaces. This is important, since the molds, like those shown in my said applications Serial No. 275,115 and Serial No. 275,116, are each provided with an aperture or perforation at the end opposite the ice exit to admit air behind the ice to permit it to drop out.

The molds 8, 9, 10 and 11 differ from each other in detail. They all have imperforate, removable closures for their ice exits which are the otherwise, open ends at the bottom of the molds. Molds 8, 9 and 10 have apertures 12 in their ends opposite their ice exits. The apertures 12 are smaller in diameter than the ends of the molds to provide strengthening flanges 13 for the rims of the molds. A flat flange 14 surrounds the ice exit of mold 9 and mold 10 has a bead 15.

Mold 11 has no strengthening flange around its top rim and its opening 16 is the full diameter of the mold at this point. Mold 10 has the upper part 17 of its body made hexagonal in shape to assist the hands in placing the mold on and removing it from the exit closure 7. Mold 11 has a strengthening flange 18 surrounding the ice exit.

All of the ice exit closures 7, shown in molds 8, 9, 10 and 11 have concave tops 19 which provide more space than do flat tops and also facilitate the removal of the ice filled molds from the closures.

Fig. 7 is a plan and Fig. 8 is an axial section of a mold 20, having an ice exit at its lower end in which there is an ice exit closure 21. The closure 21 has an eccentric cavity 22 formed in its top 23, and the mold 20 has an eccentric aperture 24 in its end opposite the exit closure 21. If the mold 20 be filled with water, a button 25, of ice as shown in dotted lines in Fig. 8 will sometimes form above the opening in the top of the mold which must be removed bodily or by melting before the ice in the mold will be free to leave it. By twisting the mold 20 upon its exit closure 21, the eccentric neck of the external button will be sheared off and the ice in the mold released. Cavity 22 is further from the axis of the mold than aperture 24 and may be of larger diameter, so that it holds the ice in the mold from turning with the mold. The eccentric aperture 24 is useful in helping to shear off the button 25 of ice even with a closure member which does not have an eccentric cavity formed in its top.

The term eccentric as herein used is intended to cover any shape of aperture or depression, a portion of whose periphery is at a greater distance from the mold axis than are other portions, so that relative rotation of the ice and the member in which the aperture or depression is located will shear the ice.

It is important to have good heat conducting contact or paths between the water which is to be frozen, and the cold metal of the refrigerating unit. It will be seen that the water in the molds has a large contact area with the exit closures which in turn are supported directly upon and make broad heat conducting contact with the metal bottom of the ice freezing compartment of the refrigerator.

Figs. 3, 4, 5, 6 and 8 may be taken as representing axial sections of molds having separate closures which are either round, square, or other geometric form in plan view. It is obvious that such individual molds mounted upon individual ice exit closures may be placed loosely in the ice freezing compartment of a refrigerator and be removed one at a time for use as desired.

In Figs. 9 and 10 there are shown a plan and axial section respectively, of an individual mold 26 and its mold closure 27, the latter being square in plan to facilitate grasping when the mold and closure are being handled. The body of mold 26 is less tapered than are its ice exit portion and the interfitting portion of closure 27. The aperture 28 in mold 26 is of smaller diameter than the apertures shown in molds 8, 9, 10, 11 and 20. To fill the mold 26, it should be separated from its closure 27, and held, ice exit end up, in the hand with a finger closing the aperture 28. When the mold is full the closure 27 may be inserted in the ice exit. It may then be supported either end up in the ice freezing compartment of a refrigerator. It will be understood that a hole larger than that shown at 28 may be used in a mold and closure such as are shown in Fig. 9.

It will be understood that if relatively small apertures be provided in the upper ends of the molds instead of the holes shown in the drawing that the molds will then have to be inverted so as to have their exit ends uppermost when being filled with water and that the end closures which must be removed for filling the molds must be entered into the ice exits while the molds are full in order not to have air entrapped in the molds.

I do not limit my invention to the specific apparatus shown and described herein, but claim as my invention all embodiments thereof coming within the scope of the appended claims.

I claim:

1. In refrigerating apparatus, an individual ice mold comprising a cup of circular cross section, having an ice exit at its bottom end, an aperture at its top end, and a substantially air-tight, removable, mold supporting closure for its bottom end having a depression in its top surface eccentric to the axis of said mold, said aperture being eccentric to said mold axis.

2. In refrigertaing apparatus a tray embodying a plurality of the mold supporting closures defined in claim 1, and a plurality of the cups defined in claim 1 supported on said closures.

3. In refrigerating apparatus, an individual ice mold having a freezing cavity of circular cross section, an ice exit at one end of said cavity, an aperture eccentric to the axis of said cavity through the wall opposite said exit and a substantially air-tight, removable closure for said exit.

4. In refrigerating apparatus an individual ice mold having a freezing cavity of circular cross section, an ice exit at one end of said cavity, an opening from said cavity opposite said exit and a substantially air-tight, removable closure for said exit having a depression in its face presented to said cavity, said depression being eccentric to the axis of said cavity.

5. In refrigerating apparatus an individual ice mold having a freezing cavity, an ice exit at one end of said cavity, an opening from said cavity opposite said exit, means forming a substantially air-tight removable closure for said exit and preventing relative rotation of said closure and ice frozen in said cavity.

6. In refrigerating apparatus, the combination with a plurality of individual ice molds, each comprising a cup having an ice exit at its bottom end and an opening in its top end, of a tray having a plurality of spaced, upwardly projecting, ice exit closures, each adapted to make a substantially air-tight fit with the ice exit of one of said cups, said cups being removably supported upon said closures.

7. In refrigerating apparatus an individual ice mold comprising a cup having an ice exit at its bottom end and an opening in its top end, and a substantially air-tight removable closure for said ice exit, said closure having a depression in its top surface.

8. In refrigerating apparatus, an individual ice mold having a freezing cavity of circular cross section, an ice exit at one end of said cavity, an opening from said cavity opposite said exit, said opening being positioned and shaped for shearing off ice frozen in said opening, and means forming a substantially air-tight removable closure for said exit and preventing relative rotation of said closure and ice frozen in said cavity.

LESLIE G. HENNING.